United States Patent [19]
Smith

[11] 3,930,189
[45] Dec. 30, 1975

[54] WHEEL SLIP CORRECTION SYSTEM

[75] Inventor: Russell M. Smith, North East, Pa.

[73] Assignee: General Electric Company, Erie, Pa.

[22] Filed: Oct. 11, 1974

[21] Appl. No.: 514,087

[52] U.S. Cl................................. 318/52; 318/144
[51] Int. Cl.² ........................................ H02P 5/46
[58] Field of Search ............................ 318/52, 144

[56] References Cited
UNITED STATES PATENTS

| | | | |
|---|---|---|---|
| 3,183,422 | 5/1965 | Stamm................................. | 318/52 |
| 3,296,510 | 1/1967 | Stamm................................. | 318/52 |
| 3,321,684 | 5/1967 | Stamm................................. | 318/58 UX |
| 3,629,676 | 12/1971 | Ephraim, Jr. ....................... | 318/144 |
| 3,719,868 | 3/1973 | Mesparran........................... | 318/52 |
| 3,737,745 | 6/1973 | Chevaugeon ........................ | 318/52 |
| 3,743,900 | 7/1973 | Johansson............................ | 318/52 |
| 3,790,871 | 2/1974 | Smith................................... | 318/52 |

*Primary Examiner*—T. E. Lynch
*Attorney, Agent, or Firm*—C. A. Helzer; W. C. Bernkopf

[57] ABSTRACT

A wheel slip control system for electric traction motor drives employing series-type direct current traction motors having field and armature windings connected in series electrical circuit relationship, a power rectifier and a source of alternating current supplying the power rectifier. The series-type traction motors are connected across the output from the power rectifier for the supply of normal excitation direct current. The improvement comprises a current transformer having primary and secondary windings wound on a common core. The primary winding is serially connected in the supply connection between the alternating current power source and the power rectifier. The secondary rectifier is provided with its output connected to supply auxiliary field current to the field winding of each series-type direct current traction motor in addition to the normal direct current excitation supplied through the power rectifier. The polarity of the auxiliary field current is such that upon addition to the normal excitation direct current, the field current is maintained substantially constant or slightly less so from what it had been prior to a wheel slippage condition, and a detector is provided for detecting a wheel slippage condition and controlling supply of the output current from the secondary winding of the current transformer to the secondary rectifier for enabling the supply of auxiliary field current to the field winding of the series-type direct current traction motor that was slipping.

11 Claims, 4 Drawing Figures

WHEEL SLIP CORRECTION SYSTEM

BACKGROUND OF INVENTION

1. Field of Invention

This invention relates to a new and improved wheel slip control for electric drive systems.

More particularly, the invention relates to an improved wheel slip control for electric drive systems of the type employed on electric driven vehicles such as diesel-electric locomotives, and which employ an alternating current supply and series-type direct current traction motors. The improved wheel slip control provides for the selective reduction in tractive effort of any one of a plurality of series-type direct current traction motors to arrest wheel slippage without requiring that the tractive effort of non-slipping motors be reduced, unless the connection is applied simultaneously to two or more motors, and accomplishes this in a reliable and relatively low cost manner.

2. Background of Problem

An improved wheel slip control system for electric locomotives and the like employing series-type direct current traction motors, is disclosed in U.S. Pat. No. 3,737,745 — issued June 5, 1973 to Russell M. Smith and Rene J. Chevaugeon for WHEEL SLIP CONTROL SYSTEM, Assigned to the General Electric Co. The wheel slip control system described in U.S. Pat. No. 3,737,745 is intended for use primarily with traction motor drive systems having relatively stable (stiff) supply voltage sources of either direct or alternating current. Because of their nature, diesel-electric locomotives and like equipment employing series-type direct current traction motor drives, do not have available a stable supply voltage source that can be readily used with wheel slip control systems of the type disclosed and claimed in U.S. Pat. No. 3,737,745. To overcome this problem, the present invention was developed.

SUMMARY OF INVENTION

It is, therefore, a primary object of the present invention to provide a new and improved wheel slip control system for controlling slippage of individual ones of a plurality of series-type direct current motors comprising a traction motor drive system, without requiring that the tractive effort of non-slipping motors be reduced.

A further object of the invention is to provide such a wheel slip control system which is capable of use with relatively unstable, variable voltage power supply sources of the kind available with diesel-electric locomotives and like equipment.

A still further feature of the invention is to provide a wheel slip control system having all of the above-set-forth characteristics and which is reliable in operation, easily maintained and relatively inexpensive to manufacture and install.

In practicing the invention, a wheel slip control system for electric traction motors employing series-type direct current traction motors having field and armature windings connected in series electrical circuit relationship, power rectifier means and means for supplying alternating current to the power rectifier means, is provided. The series-type traction motors are connected across the output from the power rectifier means for the supply of normal excitation direct current to the motors. The improvement conprises current transformer means having primary and secondary windings wound on a common core. The primary winding is serially connected in the supply connection between the means for supplying alternating current and the power rectifier means. Secondary rectifier means are provided having the output thereof (upon excitation) coupled to supply auxiliary field current to the field winding of each series-type direct current traction motor in addition to the normal direct current excitation from the power rectifier means. The polarity of the auxiliary field current is such that upon addition to the normal excitation direct current, the total current flowing in the field winding is maintained at a substantially constant value or slightly less from that which had been flowing prior to the occurrence of a wheel slippage condition. Means are provided which are responsive to the occurrence of a wheel slippage condition for effectively supplying output current from the secondary winding of the current transformer means to the secondary rectifier means to excite the same whereby the auxiliary field current is supplied to the series field winding of the direct current traction motor that is slipping. The current transformer means is designed such that it has a current transformation ratio corresponding in number to the number of series connected direct current traction motor excitation circuit paths connected in parallel circuit relationship across the output of the main power rectifier means.

BRIEF DESCRIPTION OF THE DRAWINGS

These and other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

DETAILED DESCRIPTION OF PREFERRED EMBODIMENTS

Figure 1:
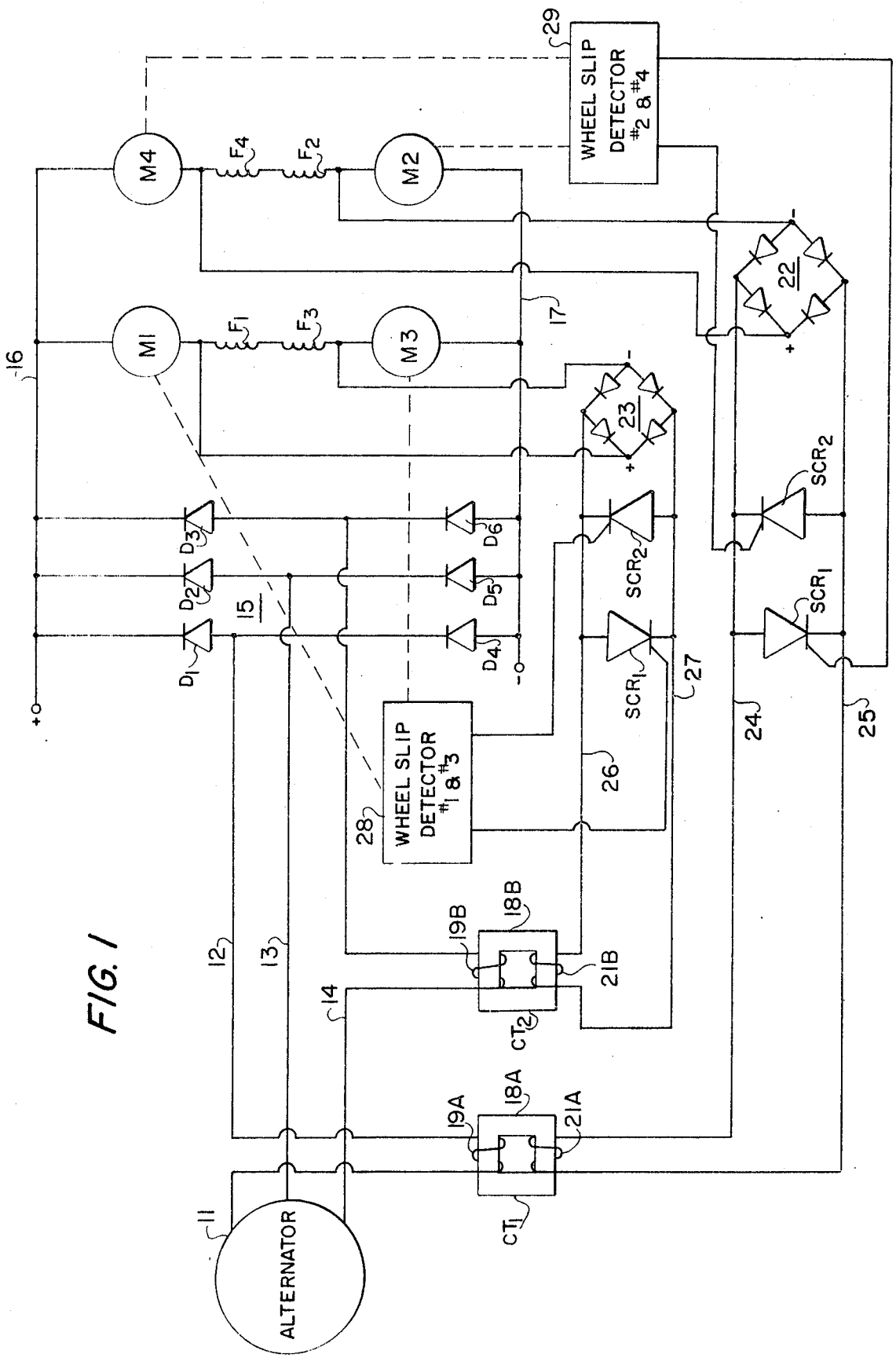
FIG. 1 is a functional block diagram of a new and improved wheel slip control system constructed according to the invention.

FIG. 1 is a functional block diagram of a wheel slip correction system constructed according to the present invention. In this system, a conventional, large, power rated three-phase alternator is shown at 11 which may be of the type generally found in diesel-electric locomotives and like equipment. The alternator 11 supplies variable voltage, three-phase alternating current electric power across the conductors 12, 13, 14 to a three-phase, full wave rectifier bridge 15 comprised by the diode rectifiers $D_1$–$D_6$. The diode rectifier bridge 15 is connected across a pair of direct current power supply terminals 16, 17 for supplying full wave rectified direct current voltage to traction motors $M_1$–$M_4$.

The traction motors $M_1$–$M_4$ are of the series type wherein the armature winding indicated at $M_1$, $M_2$, etc. are connected in series circuit electrical relationship with the corresponding field windings $F_1$, $F_2$, etc. In the traction drive arrangement shown in FIG. 1, the series traction motor $M_1$ and its associated series connected field winding $F_1$ is connected in series circuit relationship with the series field winding $F_3$ and armature winding of series traction motor $M_3$ and the series circuit thus comprised, is connected across the direct current power supply terminals 16, 17. For convenience and simplicity of illustration, the usual speed regulating, series-parallel connected resistor speed controlling network, and other control features normally associated with traction motor drive systems have not been illustrated since they do not comprise a part of the present invention.

The improvement made available by the present invention comprises a wheel slip correction system formed by a pair of current transformers $CT_1$ and $CT_2$ whose primary windings are connected in series circuit relationship in the conductors 12, 14, respectively, between alternator 11 and the diode rectifier bridge 15. Each of the current transformers is comprised by a common core member 18A, 18B, a primary winding 19A, 19B and a secondary winding 21A, 21B. The primary and secondary windings of each current transformer are wound on separate legs of their respective core members 18A, 18B. In the embodiment of the invention shown in FIG. 1, the core members 18A, 18B have been illustrated as oval or square shaped with central openings therein; however, the current transformers may have any desired physical configuration and may comprise conventional, commercially available current transformers having an appropriate current transformation ratio as described hereinafter.

Each of the secondary windings 21A, 21B of current transformers $CT_1$, $CT_2$ are connected across one set of diagonally opposite terminals of an auxiliary diode rectifier bridge 22 or 23, respectively. The remaining set of diagonally opposed terminals of the respective auxiliary rectifier bridges 22, 23 are connected across the series connected field windings $F_2$, $F_4$ of series traction motors $M_2$, $M_4$ and the series field windings $F_1$, $F_3$ of series traction motors $M_1$, $M_3$, respectively. The polarity of the connection of the auxiliary diode rectifier bridges 22, 23 is such that when the secondary rectifier bridges conduct, they supply an auxiliary direct current which is circulated through the respective sets of field windings $F_2$, $F_4$ and $F_1$, $F_3$ in an aiding direction. That is to say, normally, the same armature and field current circulates through the respective series traction motors such as $M_1$ and $F_1$ and thereafter through $F_3$ and $M_3$ in series between the direct current positive power supply conductor 16 and negative supply conductor 17. The auxiliary current supplied from the auxiliary rectifier 23 augments or adds to whatever field current is flowing in the field windings $F_1$, $F_3$ under the conditions to be described hereinafter. A similar connection is provided for the auxiliary field current fed to the field windings $F_4$, $F_2$ in series from the auxiliary diode rectifier bridge 22.

The secondary windings 21A, 21B of current transformers $CT_1$, $CT_2$ have their outputs connected across the diagonally opposite terminals of their respective secondary rectifier bridges through conductors 24, 25 and conductors 26, 27, respectively. Each set of auxiliary supply conductors 24, 25 and 26, 27 are short circuited by a pair of reverse polarity, parallel connected silicon control rectifiers $SCR_1$, $SCR_2$ connected across the respective supply conductors. The short circuiting silicon control rectifiers $SCR_1$, $SCR_2$ for supply conductors 24, 25 have their control gates connected to the output of a wheel slip detector 29 for the traction motors $M_2$, $M_4$, and the silicon control rectifiers $SCR_1$, $SCR_2$ connected across supply conductors 26, 27 have their control gates connected to the output from a wheel slip detector 28 for the traction motors $M_1$, $M_3$. The wheel slip detectors 28, 29 may comprise any conventional means for detecting a wheel slippage condition of any one of the traction motors $M_1$–$M_4$. For example, these devices may comprise tachometer generators, voltage measuring bridges, etc., of the type described in greater detail in the above-referenced U.S. Pat. No. 3,737,745. The connection of the wheel slip detectors to the respective short circuiting silicon control rectifiers $SCR_1$, $SCR_2$ is such that the SCRs normally are conducting in the absence of a wheel slippage condition. Upon the occurrence of a wheel slip condition in either of the series connected motors of a set, such as $M_1$, $M_3$, the associated short circuiting SCRs will have the gate signal removed therefrom so that they assume a current blocking (non-conducting) condition. That is to say, the SCRs become open circuited and any voltage appearing across the auxiliary supply terminals 26, 27 will be applied across the diagonally opposite terminals of auxiliary rectifier 23 and will result in the supply of an auxiliary field current through the series connected field windings $F_1$, $F_3$.

In operation, the wheel slip correction system shown in FIG. 1 (as well as in the other figures) attempts to keep the field current of a series type traction motor detected to be slipping approximately constant after wheel slip occurs. Consequently, the motor is made to exhibit shunt motor characteristics resulting in reduction of the tractive effort quite rapidly as the wheel slippage causes its speed to exceed that of the locomotive or other unit being driven by the traction motor drive system. In the wheel slip control systems described in U.S. Pat. No. 3,737,745, it is necessary that the supply voltage to the traction motors be maintained approximately constant. This condition is difficult to satisfy in a diesel-electric locomotive or other similar traction motor drive system so that some other method of varying field excitation to provide a decreasing torque characteristic as wheel slip occurs, becomes necessary. In the wheel slip correction system herein described, after wheel slip is detected, the field current of the slipping traction motor is either increased so that the torque of the motor falls off even more rapidly than that of a comparable shunt motor, or as wheel slip occurs, the field current of the slipping motor is allowed to decay but at a rate which is less than that of the armature current. In other words, the auxiliary field current introduced from the auxiliary power supply keeps the field current well above the armature current but still allows it to decrease. This results in slowly decreasing the tractive effort of the slipping motor so that it is self-correcting without requiring the removal of large amounts of power from the entire traction motor drive system, or from other, non-slipping traction motors.

In the arrangement shown in FIG. 1, the current transformers $CT_1$, $CT_2$ sense the current being supplied to the traction motor drive system through the alternating supply conductors 12, 13, 14. In normal operating conditions without wheel slippage, it is expected that the total current supplied to the traction motor drive system will split about evenly between the two parallel circuit paths comprised by the series connected motors $M_1$, $M_3$ and the series connected motors $M_4$, $M_2$, respectively, and the current transformers $CT_1$, $CT_2$ must be designed to accommodate currents of this magnitude. In this arrangement, a current transformation ratio of 2–1 which provides a current flowing in the secondary winding that is one half of the current flowing in the primary winding, provides auxiliary field current that is more than adequate to meet anticipated needs.

As stated earlier, the short circuiting silicon control rectifiers $SCR_1$, $SCR_2$ are normally conducting so as to short circuit the secondary windings of the current transformers and provide little or no loading on the overall system during normal operation. Only enough voltage is developed across secondary windings 21A, 21B to make up for losses in the system. However, upon the occurrence of a slipping condition in one of the motors, for example, motor $M_1$, the armature current through the motor will decrease rapidly due to the increased back EMF generated by reason of the slipping condition. The slipping condition will be detected instantaneously by the wheel slip detector 28 which thereafter turns off short circuiting $SCR_1$ and $SCR_2$. Just prior to the establishment of the above-described conditions, the normal current flowing in the primary winding (19B) of current transformer $CT_1$ will have established a magnetic flux condition in the core which will require that the secondary current then flowing in secondary winding 21B be maintained in accordance with Lenz's Law. Consequently, with the short circuiting $SCR_1$, $SCR_2$ turned off, a rather large voltage is developed across the secondary field winding 21B which supplies current through auxiliary rectifier 23 to the series connected field windings $F_1$, $F_3$ to maintain the current through the field windings at a substantially constant value or perhaps somewhat less than the value previously maintained under normal, non-slipping operating conditions. As a result of the supply of this auxiliary field current in aiding relationship to the suddenly reduced, normally supplied field excitation current, the series type traction motor will be caused to exhibit shunt motor characteristics, and the tractive effort of the slipping motor will be gradually reduced until the slipping condition is corrected. The particular phenomenon whereby this reduction in tractive effort is achieved, is described in greater detail in the above-referenced U.S. Pat. No. 3,737,745 and particularly with respect to FIG. 3 thereof. While FIG. 1 illustrates what is essentially a single phase arrangement of the current transformer and auxiliary rectifiers, a complete three-phase arrangement readily could be provided by one skilled in the art in the light of the above teachings.

Figure 2:
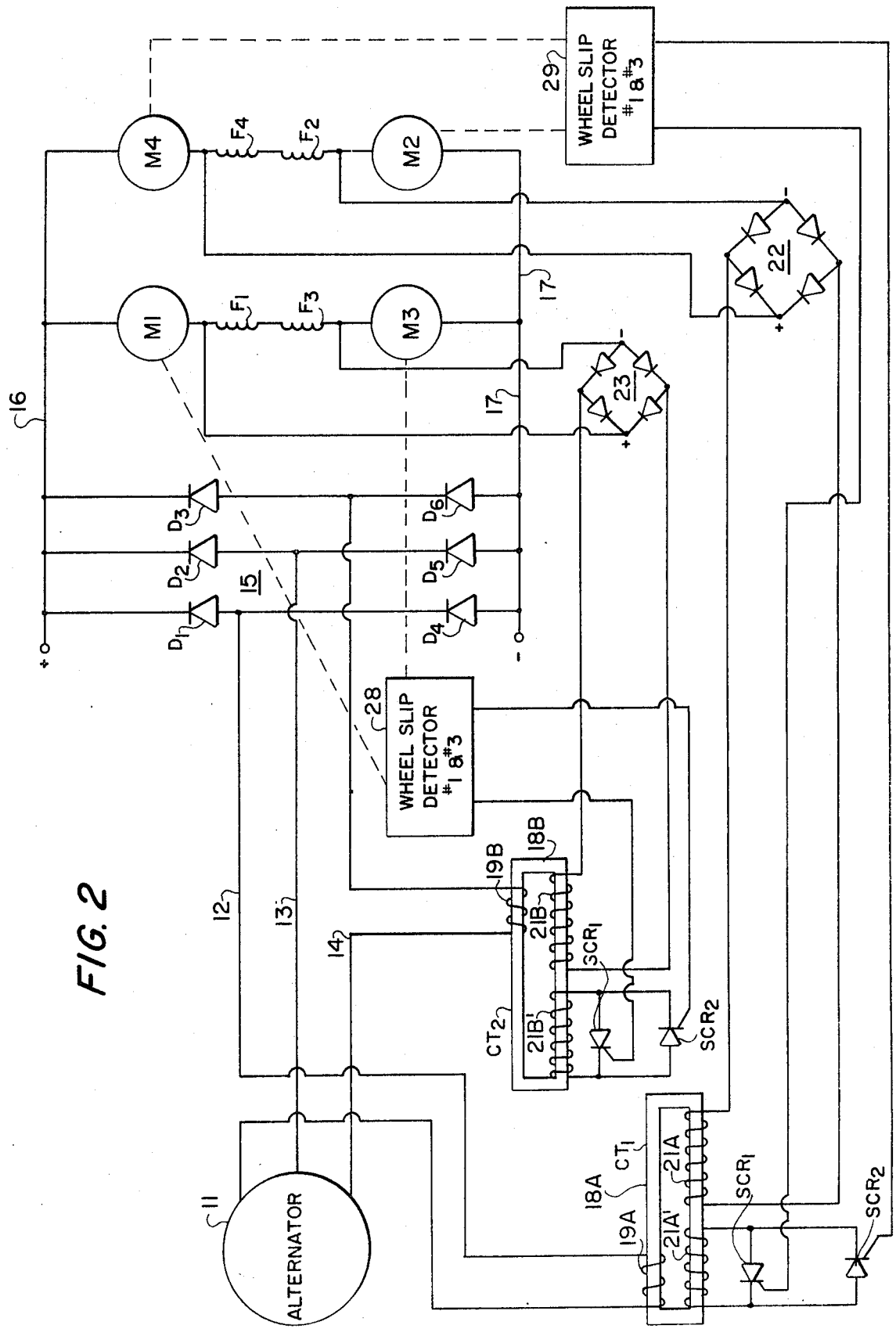
FIG. 2 is a functional block diagram of a modified form of the wheel slip control system shown in FIG. 1.

The circuit shown in FIG. 1 has some faults in that the short circuiting silicon control rectifiers $SCR_1$, $SCR_2$ must rate the full KVA of the power to be supplied to the traction motor field windings $F_1$, $F_3$, and further they must have a high current and low voltage rating. The circuit shown in FIG. 2 of the drawings provides a better impedance match for the short circuiting SCRs; however, they still must rate the full KVA of the power to be supplied to the traction motor field windings. The arrangement shown in FIG. 2 is substantially identical to that of FIG. 1 with the exception that two secondary windings 21A, 21A′ and 21B, 21B′, are provided for each of the current transformers $CT_1$, $CT_2$. The secondary windings 21A, 21B are connected directly across the diagonally opposite input terminals of the auxiliary rectifier bridges 22, 23, respectively, without any short circuiting SCR devices. The additional secondary windings 21A′, 21B′ are connected directly across the respective sets of short circuiting silicon control rectifiers $SCR_1$, $SCR_2$ with the gates of the short circuiting SCRs being connected to the output from the wheel slip detector 29, 28, respectively.

In operation, the circuit of FIG. 2 functions in the following manner. Under normal operating conditions without wheel slippage, short circuiting silicon control rectifiers $SCR_1$, $SCR_2$ are turned on and conducting. Consequently, current will be allowed to flow through the secondary windings 21A′, 21B′ causing the cores to be operated in a substantially saturated condition so that essentially no power is transferred through the secondary windings 21A, 21B, respectively, to the field windings of the traction motors. Upon the occurrence of a wheel slippage on any of the traction motors, for example motor $M_1$, the short circuiting silicon control rectifiers connected across the additional secondary winding 21B′ will be turned off thereby open circuiting these windings. As a consequence, current must flow in winding 21B due to the action of Lenz's Law and will be coupled through the auxiliary rectifier 23 to the series field winding $F_1$, $F_3$ in the manner described above with respect to FIG. 1. This results in the introduction of sufficient auxiliary field current to reduce the tractive effort of the slipping motor $M_1$ until the slippage condition is corrected and the traction motor drive system returns to a normal operation condition.

Figure 3:
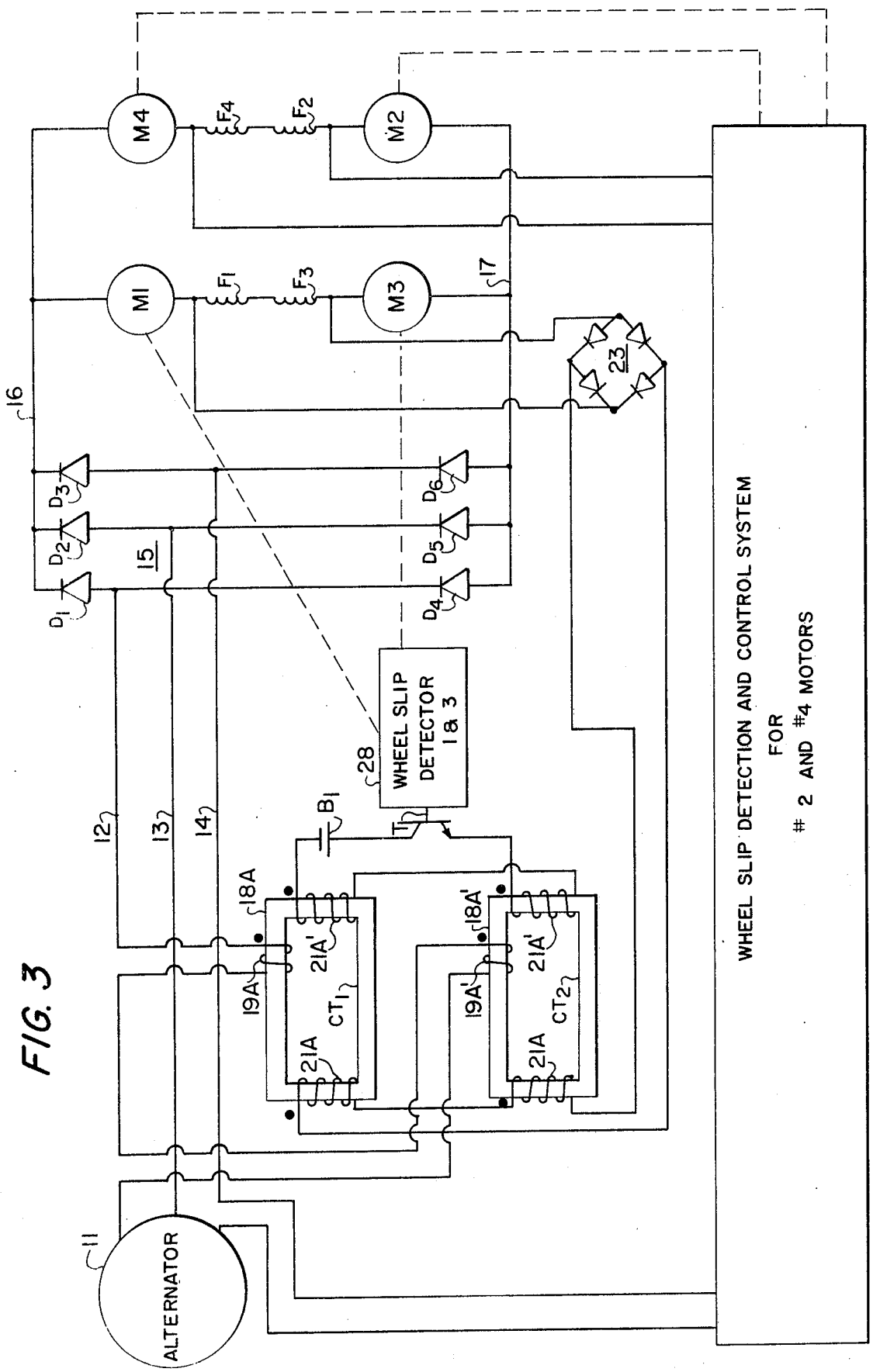
FIG. 3 is a functional block diagram of still a different form of wheel slip control system constructed according to the invention, and which requires lower cost and fewer power rated components than the embodiments of the invention shown in FIGS. 1 and 2.

In the arrangements shown in FIGS. 1 and 2, the full KVA of the auxiliary power supply to the series field windings of the series type DC traction motor, is required in the three main components, namely, the short circuiting silicon control rectifiers, the current transformer and the auxiliary rectifier bridges and, thus, these components must be rated to handle the power required. Providing a full three-phase system will increase the number of individual components, but it would not result in changing the total KVA rating of the elements. To reduce the costs of the wheel slip correction system then, it becomes necessary to reduce the KVA rating of any or all of the above-listed main components of the wheel correction system. FIG. 3 of the drawings illustrates a wheel slip control system incorporating many of the features of the systems shown in FIGS. 1 and 2, but which also allows a reduction in the KVA rating of certain of the components.

In FIG. 3, it will be seen that for a single axle drive arrangement comprised of two series type DC traction motors connected in series across the main direct current excitation supply terminals 16, 17, two current transformers $CT_1$, $CT_1'$, are provided. The setup for additional axles would be the same; however, for convenience and simplicity of illustration, the arrangement for a second axle comprised by traction motors $M_1$, $M_4$ is shown only in block diagram form.

In FIG. 3, the current transformers $CT_1$, $CT_1'$ for each given axle are identical in construction and rating. The secondary windings 21A of both current transformers $CT_1$, $CT_1'$ are connected so that they add in voltage. Neglecting for the moment the effect of the additional secondary windings 21A′ on each of the respective core members 18A, 18A′, the primary windings 19A, 19A' are wound in a direction such that the flux from the secondary windings 21A on each core member opposes the flux from the primary windings 19A, 19A', respectively. Thus, the ampere turns NI from each of the windings 21A on the respective core members 18A, 18A' should be equal and opposite to the ampere turns NI of the respective primary windings 19A, 19A'.

The two additional secondary windings 21A' on the respective core members 18A, 18A' are connected in opposing relationship so that the alternating current voltage from the sum of the two windings 21A' is zero or substantially zero. The voltage handling requirements for the control transistor $T_1$ therefore is only the voltage of the battery source $B_1$.

The arrangement is such that the control transistor $T_1$ is turned on by the wheel slip detector 28 only under normal operating conditions where there is no wheel slippage, and is caused to turn off upon the occurrence of a wheel slip condition of either of the motors $M_1$, $M_3$. Under the normal operating conditions with no wheel slippage, direct current flows in the two additional secondary windings 21A' on each of the cores causing the respective core members 18A, 18A' to be driven into saturation. For this to happen, the ampere turns NI supplied by control transistor $T_1$, battery $B_1$ and the windings 21A' must be greater than the maximum ampere turns NI from the supply conductor 12 and primary windings 19A, 19A'. Upon the occurrence of a wheel slippage condition, for example series type traction motor $M_1$, control transistor $T_1$ is turned off by wheel slip detector 28. Removal of the direct current flowing through the additional windings 21A' allows the core members 18A, 18A' to be driven out of saturation by the primary windings 19A, 19A' and to couple power through the secondary windings 21A on each core member. This results in the production of an auxiliary current flow that is supplied through the auxiliary rectifier 23 to the series field windings $F_1$, $F_3$ in an aiding direction to thereby correct the wheel slippage condition.

In the arrangement of FIG. 3, only the current transformer and auxiliary rectifier 23A need carry the full KVA rating of the auxiliary current to be supplied to the field windings of the series type DC traction motors. The control transistor $T_1$, battery $B_1$ and associated windings 21A' need to carry only adequate current to assure saturation of the core members 18A during normal operating conditions of the traction motor drive system.

Figure 4:
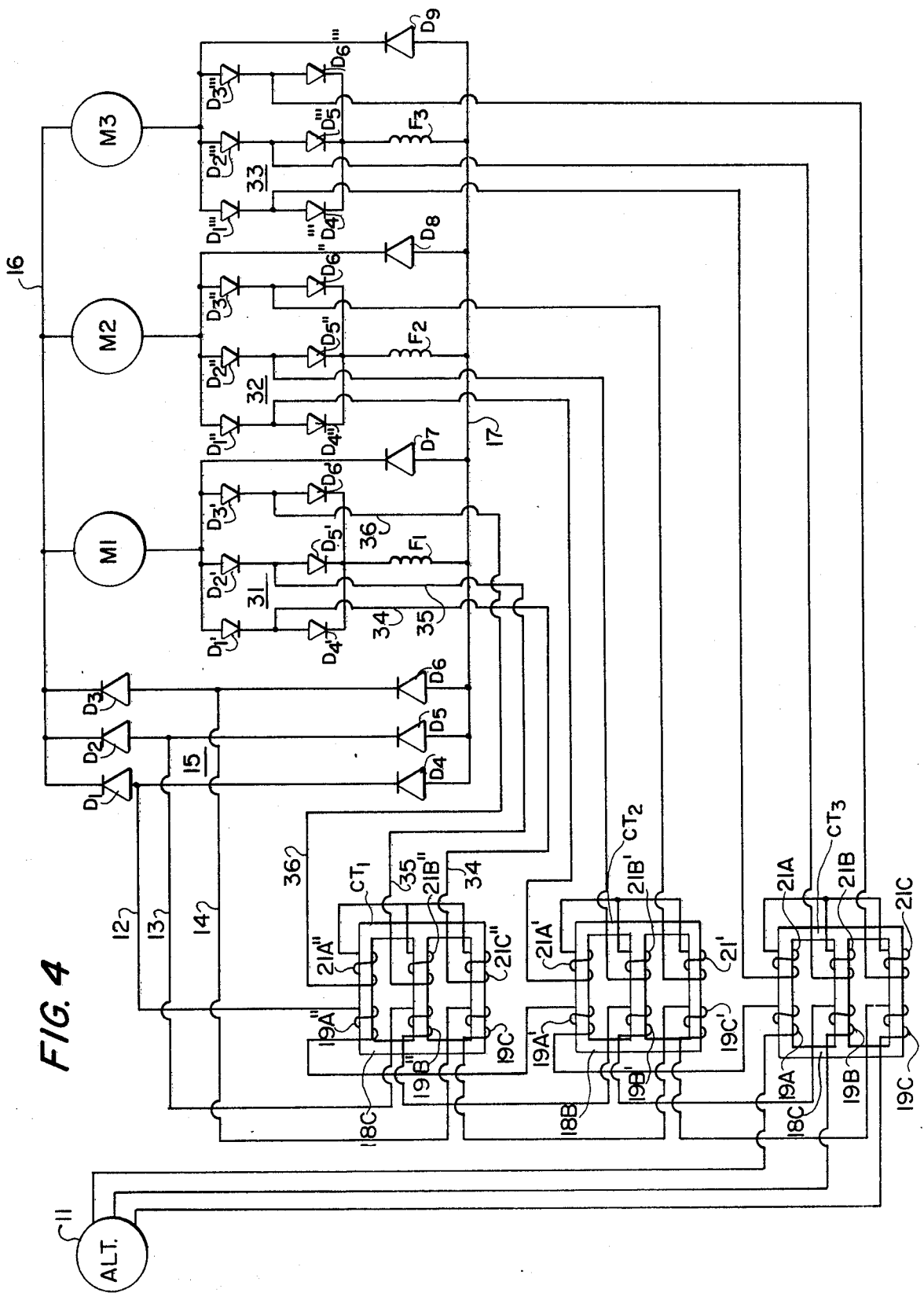
FIG. 4 is a detailed schematic circuit diagram of a preferred form of the invention which obviates the need for a separate wheel slippage detector and associated control circuitry.

A preferred embodiment of the invention is shown in FIG. 4 of the drawings wherein no wheel slip detection and control elements are required. The wheel slip correction control system shown in FIG. 4 provides to the series traction motors a characteristic very close to that which would be obtained by a shunt or separately excited traction motor. In FIG. 4, a complete three-phase system is disclosed for exciting three series type traction motors $M_1$, $M_2$, $M_3$ which are connected in three separate parallel paths across the output of the main power rectifier 15 through the main direct current power supply terminals 16, 17. The series connected field windings of the respective series type DC traction motors are shown at $F_1$, $F_2$, $F_3$. A three-phase alternator 11 which is driven by the prime mover such as a diesel engine of a diesel-electric locomotive, supplies three-phase, variable voltage alternating current power to the main power rectifier bank 15 through the conductors 12, 13, 14.

Three current transformers $CT_1$, $CT_2$, $CT_3$, one for each traction motor, are provided. Each current transformer has a three-phase connection and, for this purpose, is provided with a three leg core member 18A, 18B, 18C with the respective legs of the core members having a primary winding, such as 19A, 19B, 19C for core member 18A, connected in series circuit relationship in the three-phase connection to the main power rectifier bank 15 provided by conductors 12, 13, 14. Current transformers $CT_2$, $CT_1$ have corresponding primary winding connections, with all of the primary windings 19A, 19A', 19A'' for all three core members being connected in series circuit relationship in the single phase connection comprised by conductor 12, for example. The primary windings 19B, 19B', 19B'' and the primary windings 19C, 19C', 19C'' are similarly connected in series circuit relationship in their respective phase supply conductors 13, 14.

The secondary windings of the current transformers $CT_1$, $CT_2$, $CT_3$ are wound around corresponding legs of the respective core members 18A, 18B, 18C in tightly coupled relationship with their respective corresponding primary windings. For example, the secondary winding 21A is wound on a common leg of core member 18A with primary winding 19A, 21B with 19B and 21C with 19C, etc. Each set of secondary windings of a respective current transformer is connected in a three-phase Y connection and, for this purpose, one terminal of each secondary winding on a respective core member is connected in common with the corresponding terminal of the two remaining secondary windings on that particular core member. The remaining terminals of the secondary windings are connected to an intermediate tap point of one set of a pair of series connected diode rectifiers, such as $D_1$, $D_4$ comprising part of a three-phase auxiliary rectifier bridge 31, 32 or 33 that is connected in series circuit relationship between the respective series traction motors and their series connected field windings. For example, in the series path comprised by traction motor armature $M_1$ and series field winding $F_1$ the auxiliary three-phase bridge rectifier 31 is connected in series circuit relationship with it through a set of common, diagonally opposed terminals indicated at A and B. The intermediate tap points of the sets of series connected diode rectifiers of bridge rectifier 31, namely, the intermediate tap points of $D_1'$, $D_4'$, $D_2'$, $D_5'$ and $D_3'$, $D_6'$ are connected through the conductors 34, 35, 36 to the remaining three terminals of the secondary windings 21C'', 21B'', 21A'' of the current transformer $CT_1$, respectively. While in this arrangement, these secondary windings of the current transformers are connected in a three-phase Y connection, a delta connection could be employed if desired. Further, it is, of course, possible to fabricate the wheel slip control system of FIG. 4 in a single phase arrangement used to control slippage of a single traction motor in place of the three-phase arrangement shown, should it be desired to do so.

Each current transformer $CT_1$, $CT_2$, $CT_3$ is designed so that it provides approximately a three to one current transformation ratio. That is to say, the secondary current flowing in each secondary winding is approximately one third of the current flowing in the primary winding. In the system of FIG. 4, three series type traction motors are shown connected in three separate parallel connected paths with each parallel path taking approximately one third of the total current supplied through the main power rectifier 15 from alternator 11. It will be appreciated, therefore, that because of the three to one current transformation ratio, the current capable of being supplied from any one of the current transformers $CT_1$, $CT_2$ $CT_3$ through their respective auxiliary rectifier bridges to the respective series connected field windings $F_1$, $F_2$, $F_3$ will just about approximate the series field current normally flowing in the field winding. If four traction motors were used requiring four parallel, series connected paths, the current ratio required in the current transformers would be four to one, etc. In the case of the series parallel arrangements shown in FIGS. 1–3 of the drawings, the current ratio would correspond to the number of parallel paths or two in the particular instances of FIGS. 1–3 systems. Additionally, it should be noted that the number of current transformers required is equal to the number of parallel paths employed in the system.

In order to circulate auxiliary field current through the respective series field windings $F_1$, $F_2$, $F_3$ from their associated auxiliary rectifier bridges 31, 32, 33, feedback diodes $D_7$, $D_8$, $D_9$ are connected in reverse polarity, parallel circuit relationship across the series connected field windings and their respective auxiliary rectifier bridges in the manner shown in FIG. 4. By reason of the inclusion of the feedback diodes, should the terminal B of auxiliary rectifier bridge 31, for example, being driven positive with respect to the terminal A, auxiliary current will be circulated through the series connected field winding $F_1$ back through the feedback diode $D_7$ as will be described hereinafter.

In operation, the system of FIG. 4 functions in the following manner. For so long as the current flowing in the armature of any given traction motor (for example, traction motor $M_1$ remains constant or substantially so, then the current divides equally between the three legs of the associated auxiliary rectifier bridge 31. This same situation will exist in the remaining two parallel paths comprised by the traction motors $M_2$, $M_3$ and their associated auxiliiary bridge rectifiers 32, 33 which, in the following example, will be assumed to continue to drive in a normal manner without slipping. A portion of the current flowing through the auxiliary rectifier bridge 31 will flow through the secondary windings 21A″, 21B″, 21C″ of current transformer $CT_1$ so as to satisfy the current ratio demanded by the transformer due to the current flowing in the respective associated primary windings. For so long as this normal drive condition exists, there will be only a small voltage generated at the secondary terminals of current transformers $CT_1$ which is equal only to supplying the losses in the system, and little or no auxiliary current will be induced or supplied to the main power circuit through auxiliary rectifier 31 and field winding $F_1$. This same condition will also prevail with respect to the remaining two traction motors $M_2$, $M_3$ and their associated current transformers $CT_2$, $CT_3$.

If it is assumed that a wheel slip occurs on the traction motor $M_1$ only, then the armature current of traction motor $M_1$ will drop suddenly due to the increased back EMF generated by reason of the wheel slip. This sudden drop in the value of the armature current also tends to cause the current flowing through the auxiliary rectifier bridge 31 to drop. The current transformer $CT_1$, however, will develop whatever voltage is necessary to maintain its current ratio dependent upon of course the size of its core, number of turns in the primary and secondary windings, the current flowing under normal design operating conditions, etc. In order to maintain this current ratio, the voltage developed across the secondary windings of $CT_1$ will drive terminal B of auxiliary rectifier bridge 31 positive with respect to terminal A and current will circulate from terminal B through the field winding $F_1$ and back through feedback diode $D_7$ to terminal A in order to complete the circuit. The circulation of this auxiliary feedback current through the feedback diode $D_7$ and through series field winding $F_1$ necessarily will be sufficient to satisfy the current ratio demanded by the current transformer $CT_1$ and results in maintaining the current flowing through field winding $F_1$ at a substantially constant or only slightly lower value than that which prevailed prior to the onset of the slipping condition. The response is almost instantaneous, and does not require the use of a separate wheel detector and associated control system such as that employed in the previously described three embodiments of the invention. The circuit, however, still functions to cause the respective series type traction motors to exhibit shunt or separately excited DC traction motor characteristics upon occurrence of wheel slippage without the use of external control circuitry.

From the foregoing description, it will be appreciated that the invention provides a new and improved wheel slip correction system for controlling slippage of individual ones of a plurality of series-type direct current traction motors comprising a traction motor drive system, without requiring that the tractive effort of non-slipping motors be reduced. The improved wheel slip control system is capable of use with relatively unstable, variable voltage power supply sources of the kind available with diesel-electric locomotives and like equipment. The wheel slip control system possesses all of the above-set-forth characteristics, is reliable in operation, easily maintained and relatively inexpensive to manufacture and install.

Having described several embodiments of a new and improved wheel slip correction system constructed in accordance with the invention, it is believed obvious that other modifications and variations of the invention will be suggested to those skilled in the art in the light of the above teachings. It is, therefore, to be understood that changes may be made in the particular embodiments of the invention described which are within the full intended scope of the invention as defined by the appended claims.

What is claimed is:

1. A wheel slip control system for electric traction motors employing series-type direct current traction motors having field and armature windings connected in series electrical circuit relationship, power rectifier means and means for supplying alternating current to the power rectifier means, the series-type traction motors being connected across the output from the power rectifier means for the supply of normal excitation direct current thereto, the improvement comprising current transformer means having primary and secondary windings wound on a common core, the primary winding being serially connected in the supply connection between the means for supplying alternating current and the power rectifier means, secondary rectifier means having the output thereof upon excitation coupled to supply auxiliary field current to the field winding of each series-type direct current traction motor in addition to the normal direct current excitation from the power rectifier means, the polarity of the auxiliary field current being such that upon addition to the normal excitation direct current a reduction in the tractive effort of the motor results, and means responsive to the occurrence of a slippage condition for effectively supplying output current from the secondary winding of the current transformer means to the secondary rectifier means to excite the same.

2. A wheel slip control system according to claim 1 wherein the current transformer means has a current transformation ratio corresponding in number to the number of series connected direct current traction motor excitation circuit paths connected in parallel circuit relationship across the output of the main power rectifier means.

3. A wheel slip control system according to claim 2 wherein the auxiliary rectifier means is connected in series circuit relationship with the field winding of a respective series-type direct current traction motor, and the system further includes feedback diode means connected across the series connected field winding and series connected auxiliary rectifier means in reverse polarity relationship with respect to the auxiliary rectifier means for circulating auxiliary field current through the series connected field winding.

4. A wheel slip control system according to claim 3 wherein the auxiliary rectifier means comprises a rectifier bridge having one set of diagonally opposed terminals connected in series circuit relationship with the series connected field winding and the remaining set of diagonally opposed terminals connected across the output from the secondary winding of the current transformer means.

5. A wheel slip control system according to claim 4 wherein the system is designed for use with a multi-phase source of alternating current, the current transformer means is a multi-phase transformer means having a number of separate core paths corresponding in number to the number of phases of the alternating current source with each core path supporting a corresponding set of primary and secondary windings, the auxiliary rectifier bridge has a number of branches corresponding in number to the number of phases with each branch of the auxiliary rectifier bridge being separately connected to a corresponding secondary winding of the multi-phase current transformer means whereby each phase connection to the multi-phase alternating current source excites a different set of primary and secondary windings on the current transformer means, and there are a number of series connected excitation circuit paths containing series-type direct current traction motors connected in parallel across the output from the main power rectifier with the number of parallel circuit paths corresponding in number to the current transformation ratio of the current transformer means.

6. A wheel slip control system according to claim 5 wherein each branch of each auxiliary rectifier bridge includes a pair of series connected diode rectifiers with the output of each secondary winding of the multi-phase current transformer means having one terminal connected in common with a terminal of an adjacent secondary winding and the remaining terminal connected to the mid-tap point of the series connected diode rectifiers of an associated branch of the auxiliary rectifier bridge.

7. A wheel slip control system according to claim 6 wherein the multi-phase alternating current supply comprises a three-phase alternating current supply.

8. A wheel slip control system according to claim 1 wherein the secondary rectifier means comprises a secondary rectifier bridge and the output of the secondary winding is connected across the secondary rectifier bridge, and the system further includes short-circuiting silicon control rectifier means connected across the secondary rectifier bridge in parallel with the output from the secondary winding of the current transformer means, wheel slip detector means for sensing a wheel slip condition of the traction motor being controlled and deriving an output error control system, and means supplying the output from said wheel slip detector means to control conduction through said short-circuiting silicon control rectifier means whereby the short-circuiting silicon control rectifier means is maintained in a conducting and short-circuiting condition until the occurrence of a wheel slip condition.

9. A wheel slip control system according to claim 1 wherein the secondary rectifier means comprises a secondary rectifier bridge directly connected across the output of the secondary winding, and the system further includes auxiliary secondary winding means on each of the current transformer means, short-circuiting means connected across said auxiliary secondary winding means, and wheel slip detector means having the output thereof connected to and controlling said short-circuiting means in response to the occurrence of a wheel slippage condition.

10. A wheel slip control system according to claim 9 wherein said short-circuiting means conprises short-circuiting silicon control rectifier means connected across the auxiliary secondary winding means and responsive to the output of the wheel slip detector means such that the short-circuiting silicon control rectifier means is maintained conducting in the absence of a wheel slip condition and upon occurrence of wheel slippage, is turned off by the wheel slip detector means.

11. A wheel slip control system according to claim 9 wherein the short-circuiting means comprises control transistor means connected in series circuit relationship with a separate source of direct current and with the series circuit thus comprised being connected across at least two auxiliary secondary windings of two separate current transformer means, the two auxiliary secondary windings being connected in current opposition whereby the control transistor means controls only the auxiliary direct current energy source excitation of the two auxiliary secondary windings and the output of the sheel slip detector means controls operation of the control transistor means.

* * * * *